United States Patent Office 3,523,173
Patented Aug. 4, 1970

3,523,173
INSULATED LEAD CONNECTION
Roger E. Lull, Williamstown, Mass., assignor to Sprague Electric Company, North Adams, Mass., a corporation of Massachusetts
Filed Aug. 17, 1967, Ser. No. 661,323
Int. Cl. B23k 11/10
U.S. Cl. 219—91
2 Claims

ABSTRACT OF THE DISCLOSURE

A lead having insulation capable of sublimation is welded within a sandwich of metal strips without prior removal of the insulation in the area of the weld.

BACKGROUND OF THE INVENTION

The present invention relates to lead connection and more particularly to insulated lead connection for electrical circuitry and a method of making the same.

In the present state of the electronics art, the connection of insulated leads or wires to circuit portions is often a costly and time consuming task which is aggrevated by the use of insulation which resists chemical and mechanical removal.

It is an object of this invention to provide an insulated lead connection.

It is a further object of this invention to provide a highly reliable sandwich connection of insulated wire.

I is a still further object of this invention to provide a reliable sandwich weld of insulated wire without prior removal of the insulation from the wire.

It is a still further object of this invention to provide a method of welding insulated wire.

These and other objects of the invention will be apparent from the following description taken in conjunction with the drawing.

SUMMARY OF THE INVENTION

Broadly, an insulated lead connection provided in accordance with the invention comprises a lead having insulation capable of sublimation, and said lead sandwiched between two substantially flat metal strips and welded therein without prior removal of the insulation.

In the preferred embodiment, the insulation is a high temperature material capable of sublimation and the metallic strips are a single tab which is folded around and welded to the wire and itself with no residue of the insulation remaining within the weld area.

In the method of the invention, a lead wire having an insulation capable of sublimation is placed across a metal tab which is then folded around the wire to form a sandwich. Pressure is exerted across the sandwich and a current passed through it so as to provide sublimation of the insulation and a weld of the wire and tab.

DESECRIPTION OF THE PREFERRED EMBODIMENT

Figure 1:
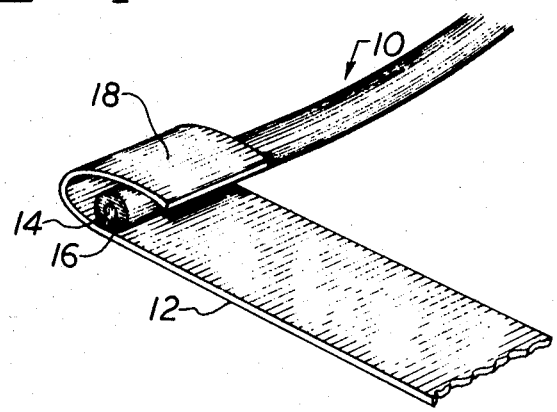
FIG. 1 is a perspective view of an insulated lead wire and tab in an early stage of assembly.

FIG. 1 shows an insulated wire 10 extending across a conductive or metallic tab 12. Wire 10 includes a thin conductive lead 14, such as #38 copper wire, enclosed within an insulative jacket 16. Insulative jacket 16 is preferably high temperature material which is capable of sublimation; for example, a polyimide or the like is suitable.

Figure 2:
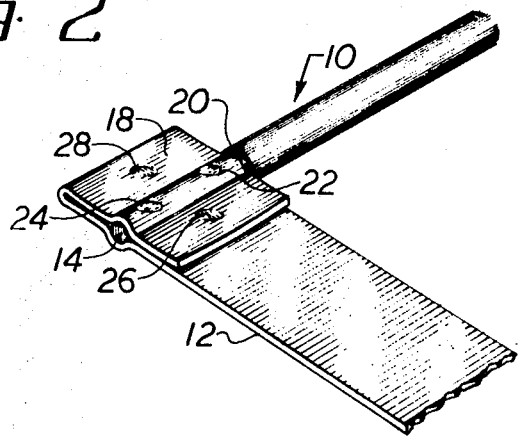
FIG. 2 is a perspective view of the completed connection.

In the method of the invention, wire 10 is first positioned transverse to strip 12 as shown in FIG. 1. Strip 12 is then folded and tightly sandwiched around lead 10 as shown in FIG. 2. Finally tab 12 is then welded to itself and lead 14. The latter steps are accomplished by applying pressure to opposite sides of the folded tab so to flatten and sandwich it around wire 10 and by thereafter passing a current through portions of the tab so as to cause sublimation of the insulative jacket 16 and a weld of lead 14 to tab 12.

In the preferred embodiment, the welding gap of a capacitor discharge welder is applied to the flap 18 of strip 12 in a parallel arrangement to wire 10. Pressure is then exerted on the folded sandwich and a first weld is made as at points 22 and 24. Pressure may be applied between the electrodes and a support provided beneath the sandwich. During the weld the insulation within the sandwich is sublimated and tab 18 is tightly flattened and bonded to lead 14 as shown in FIG. 2. Thereafter, the welding gap is positioned at right angles to the wire as at points 26 and 28 and again fired to complete the connection. This joins the tab to the lead in a compression bond without prior removal of the insulative coating and provides a satisfactory mechanical and electrical connection. Advantageously, it also retains insulation up to the sandwich connection as shown at 20 in FIG. 2, and thus, eliminates shorting of adjoining leads in close tolerance assemblies.

This construction provides a highly reliable weld of the insulated lead wire, and is particularly useful where insulation which resists chemical or mechanical removal is employed. In the preferred embodiment the wire insulation is a polyimide material such as polypyromellitimido or the like which is highly resistant to chemical and mechanical removal such as abrasion or the like.

Many different materials may be utilized in the method of the invention. For example the tab member 12 may be goldplated copper or the like. Other materials such as silver, nickel, and nickel alloys would also be suitable. Tab 12 may be any electrical extension such as an electrode or other strip like extension of an electrical circuit. Moreover, a pair of opposing strips may be employed for the sandwich rather than a single folded tab as shown.

In the preferred embodiment, the tab is approximately 5 mils thick and 20 mils wide, gold-plated copper, however, many different materials and sizes may be employed. In keeping with good welding practice, the tab thickness is related to the size of the lead and is generally close to the size of the latter.

Many types of insulation may be employed, however, it is preferable that the insulation be capable of sublimation so that no residues are left within the weld area.

In a specific example, #38 copper wire having a .3 mil thick coating of a polypyromellitimide known as Du Pont Pyre–M6 was used. This was sandwiched between a folded 5 mil thick, 20 mil wide strip of gold-plated copper material. The wire including its insulation was placed across the tab, near one of its ends. Thereafter the tab was folded around the insulated wire and parallel gap electrodes were applied.

The electrodes were positioned over wire 12 and parallel to it as at points 22 and 24 shown in FIG. 2. Electrode contact area was 200 square mils for each electrode. A force of two ounces was applied to the tab sandwich. The latter was accomplished by exerting a force between the electrodes on flap 18 and a support (not shown) underlying the bottom of the sandwich.

The welder employed was a Hughes MCW–550. The weld voltage was approximately .7 volt with a pulse duration of about 70 milliseconds. After the first firing, the electrodes were then positioned at right angles to lead 14, for example as at points 26 and 28, and the pressure and firing step were repeated to complete a weld-like compression bond of wire and sandwich.

Many other variations in the particular method described and in materials employed are also possible. Consequently, it is obvious that many changes and modifications can be made in the above described embodiments without departing from the nature and spirit of the invention, and it is to be understood that the invention is not to be limited except as set forth in the appended claims.

What is claimed is:

1. A method of welding an insulated lead to a conductve metal tab comprising the steps of positioning an insulated lead across said metal tab, folding said tab around said insulated lead, positioning electrodes on one side of said folded tab in a line generally parallel to and in the area of said lead, exerting pressure on the sandwich and passing a current through said tab sufficient to evaporate the insulation within said sandwich and to connect said lead to said tab in a weld-like bond, and welding said tab to itself at points adjacent to and on both sides of said lead.

2. A method as claimed in claim 1 wherein said weld-like bond is made by applying parallel gap electrodes to said one side of said tab in position over and parallel to said lead, exerting said pressure between said electrodes and a support underlying said sandwich, and passing said current between said electrodes, and said tab is welded to itself by applying said parallel gap electrodes across said lead position and perpendicular thereto and applying pressure and current through said electrodes.

References Cited

UNITED STATES PATENTS

| 2,250,156 | 7/1941 | Ferguson | 174—84 X |
| 3,353,263 | 11/1967 | Helms | 29—628 X |

JOSEPH V. TRUHE, Primary Examiner

J. G. SMITH, Assistant Examiner

U.S. Cl. X.R.

174—84; 219—58; 339—275